UNITED STATES PATENT OFFICE.

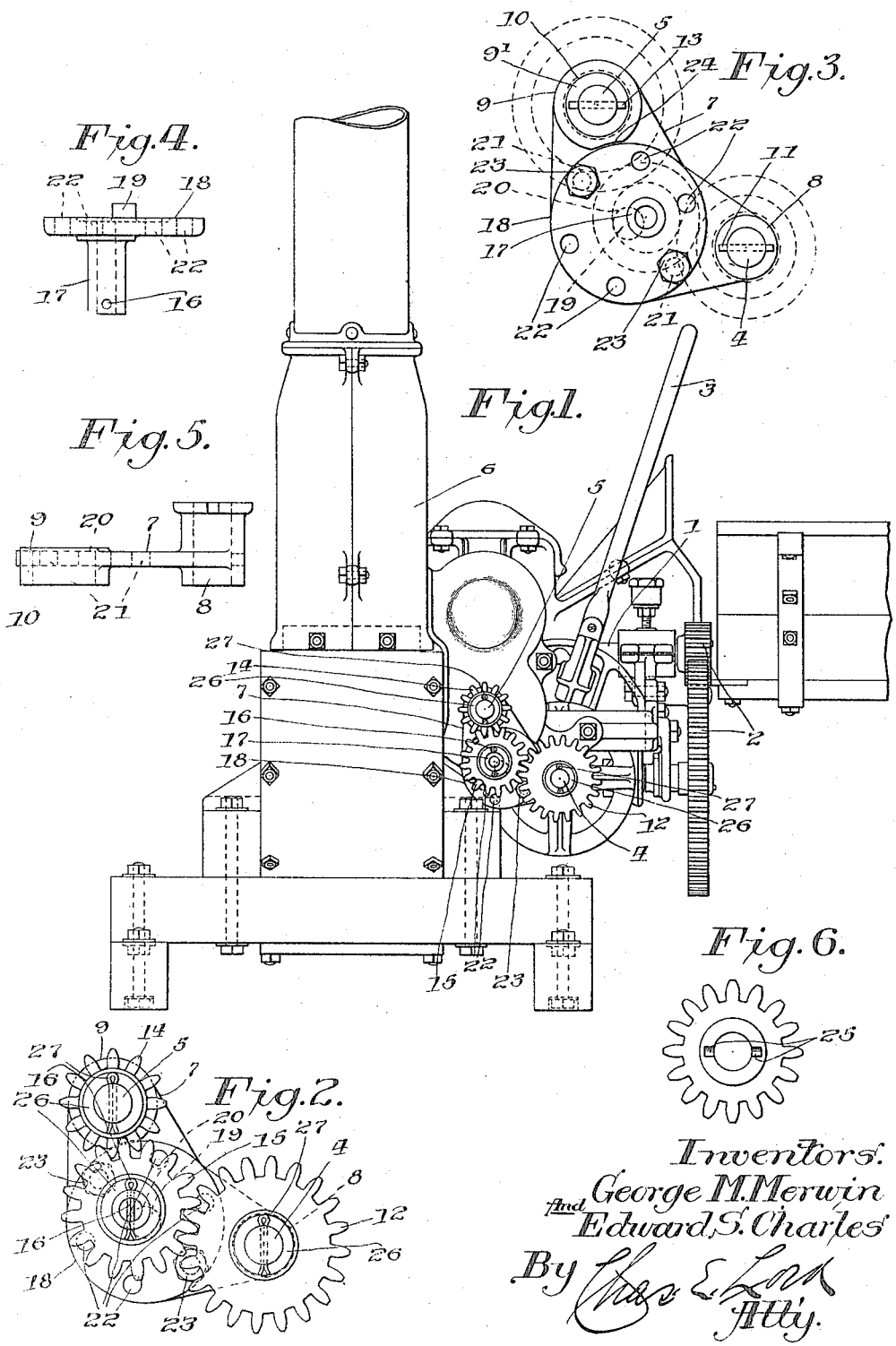

GEORGE M. MERWIN, OF BERWYN, AND EDWARD S. CHARLES, OF CHICAGO, ILLINOIS, ASSIGNORS TO INTERNATIONAL HARVESTER COMPANY OF NEW JERSEY, A CORPORATION OF NEW JERSEY.

SPEED-CHANGING MECHANISM.

1,193,174.    Specification of Letters Patent.    Patented Aug. 1, 1916.

Application filed July 10, 1915. Serial No. 39,137.

*To all whom it may concern:*

Be it known that we, GEORGE M. MERWIN and EDWARD S. CHARLES, citizens of the United States, and residents, respectively, of Berwyn, in the county of Cook and State of Illinois, and of Chicago, in the county of Cook and State of Illinois, have invented new and useful Improvements in Speed-Changing Mechanisms, of which the following is a full, clear, and exact specification.

Our invention relates to speed changing mechanisms.

It has among its objects to change the speed of one or more rotating parts in an improved manner whereby a wide range of speeds may be obtained from a given set of connections, and the adjustments for the different speeds may be made with great facility even by an unskilled operator.

A further object of our invention is to provide an improved mechanism for changing the speed of the feeding mechanism of an ensilage cutter or the like whereby the speed of that mechanism may be varied as desired to vary the length of cut throughout a wide range.

We attain these objects by an improved driving mechanism wherein an intermediate member, disposed between the driving and driven members, is carried upon an angularly adjustable member, preferably in the form of a rotatable disk the intermediate member being disposed eccentric to the axis of the disk and adjustable with the disk about the axis of the latter into a plurality of positions in such a manner as to enable the members constituting the driving, driven and intermediate members to be interchanged in various relations to produce various changes in speed and resultant changes in the length of cut.

In the accompanying drawings we have, for purposes of illustration, shown one embodiment which our invention may assume in practice.

In these drawings: Figure 1 is a side elevation of an ensilage cutter equipped with our improvement; Fig. 2 is a detail view of the speed adjusting mechanism slightly enlarged; Fig. 3 is a detail view of the same with the gears interchanged; Fig. 4 is a detail view of the adjustable member carrying the intermediate pinion; Fig. 5 is a detail view of the bracket member carrying the member shown in Fig. 4; Fig. 6 is a detail view of one of the pinions, showing the means of attaching the same to its shaft.

The ensilage cutter shown is of standard construction, having a main power shaft 1, which, through suitable driving mechanism 2, part of which is not shown, and clutch controlling mechanism 3, drives a power shaft 4, this power shaft being connected through suitable mechanism hereinafter described to the lower shaft 5 of the feeding mechanism, which feeds to the cutting mechanism, carried in the casing 6, the material delivered by the usual conveyer mechanism.

In our improved construction the speed changing mechanism is disposed between the shafts 4 and 5 and located at the end of these shafts so that it is readily accessible to an operator when desired, preferably being located on the side of the cutter adjacent the normal post of the operator when feeding the machine. The shafts 4 and 5 are, of course, mounted in stationary bearings, being journaled on the frame on suitable supports. Supported by the ends of these shafts 4 and 5, and bridging the space between them, is a bracket member 7, having a sleeve 8 on one end adapted to fit over the shaft 4, and a sleeve 9 on its opposite end adapted to fit over the shaft 5, a shaft bushing $9^1$ preferably being seated in an enlarged opening 10 in the sleeve 9. Fixed to the shaft 4 by suitable means; as, for instance, a pin 11, is the driving member 12, shown herein in the form of a gear, having twenty teeth, while carried upon the shaft 5, and fixed thereto by a pin 13, is the driven member 14, shown herein in the form of a gear having twelve teeth.

Interposed between the driving and driven members 12 and 14, and carried on the bracket member 7, is the intermediate member 15, shown herein in the form of a gear having sixteen teeth. The gear 15 is suitably attached, as by a cotter pin 16, to a bearing stud 17 formed on an adjustable member 18 shown herein in the form of a disk, having another oppositely extending stud 19 journaled in an opening 20 in the bracket 7, the stud 17 being eccentrically disposed with respect to the stud 19 and the disk being rotatable about the stud 19 to adjust the stud 17 about the stud 19 as a pivot. It will also be noted that in the bracket 7 a pair of holes 21 is provided which are adapted to coöperate with two of a series of six holes 22 disposed about the periphery of the disk 18, the disk being clamped to the bracket 7 when in any of its several positions wherein these holes are in registry, by means of nut and bolt connections 23. Attention is here also directed to the fact that in order to permit rotation of the disk 18 in making such an adjustment, the sleeve 9 of the bracket 7 is preferably cut away slightly, as at 24.

Obviously, with the gears 12, 14 and 15 disposed in the relation shown in Figs 1 and 2, the same will mesh and provide a constant rotation of the shaft 5 at a given speed. The feeding mechanism of the cutter will then, of course, feed the material to the cutting mechanism at such a speed as to give a certain length of cut. When, however, it is desired to change the speed of the parts in order to obtain a different length of cut, it is only necessary to release the nut and bolt connections 23, rotate the disk 18, and interchange the gears. For instance, the gear 12 may be placed upon the shaft 5 and the gear 15 may be placed upon the shaft 4, while the gear 14 is placed upon the stud 17, as shown in Fig. 3, after a suitable adjustment of the disk 18 about its stud 19. By such changes it should also be noted that with gears having the number of teeth described, six different changes of speed are obtainable, giving a wide range of speeds and cuts, all without the use of a single new part not already on the machine. Obviously, this mechanism may also be made of an exceedingly durable character by providing means whereby, should the load upon the feeding mechanism ever exceed a predetermined maximum, the pins 11 and 13, mentioned above, will be sheared off prior to any stripping of the gears. As shown, this is accomplished herein by providing each gear with oppositely located notches 25 adapted to receive the opposite ends of a pin when the gear is carried on either of the shafts 4 and 5. To facilitate interchanging of the gears, each of the same is also preferably provided on its opposite side with a suitably rounded portion enabling it to fit snugly upon the stud 17 on the disk 18. As shown, when the several gears are in position they are held therein by suitable washers 26 and cotter pins 16 and 27.

While we have in this application specifically described one embodiment of our invention chosen for purposes of illustration, it is to be understood that the invention itself is not limited to the form shown, but may be embodied in other forms without departing from its spirit as indicated in the following claims.

What we claim as new is:

1. In a speed changing mechanism, a plurality of shafts, an intermediate support, a train of driving members carried on said shafts and support, and means whereby certain of said driving members may be interchanged and maintained in driving relation with respect to a certain one of their number.

2. In a speed changing mechanism, a frame, a plurality of shafts journaled thereon, an adjustable member pivoted on said frame, and driving connections carried on said shafts and at one side of the pivot of said adjustable member interchangeable in a plurality of driving relations by rotating said adjustable member about its pivot.

3. In a speed changing mechanism, a frame, a plurality of shafts journaled thereon, an adjustable coöperating support pivoted on said frame and having a laterally extending stud disposed at one side of its axis, and gears carried on said shafts and stud interchangeable in a plurality of meshing relations as said coöperating support is moved about its pivot.

4. In a speed changing mechanism, a pair of shafts, an intermediate support, a train of meshing gears carried on said shafts and support, and means whereby certain of said gears may be interchanged and maintained in train relation with respect to a certain one of their number when said last mentioned gear is carried on either of said shafts or said support.

5. In combination, a frame, a plurality of shafts journaled thereon, an adjustable member carried on said frame and disposed between said shafts, meshing driving gears carried on said shafts and adjustable member, means whereby said gears may be interchanged on said shafts and adjustable member without disturbing their train relation, and a shear pin connection between one of said shafts and the gear carried thereon.

6. In combination, a frame, parallel shafts thereon, gears carried on the same end of said shafts, an angularly adjustable intermediate gear support pivoted on said frame intermediate said shafts and having a laterally extending stud at one side of its pivot, and a gear carried on said stud and meshing with the gears on said shafts.

7. In a speed changing mechanism, a plurality of shafts, an intermediate support carried on said shafts, an adjustable member pivoted on said support having a laterally extending bearing stud thereon disposed eccentrically to the pivot of said adjustable member, and coöperating driving members journaled on said shafts and said stud and interchangeable in various relations as said stud is adjusted about the pivot of said adjustable member.

8. In a speed changing mechanism, a frame, a plurality of shafts journaled thereon, a rotatable member pivoted on said frame between said shafts, said rotatable member having a laterally extending stud located at one side of its center, means for clamping said rotatable member to said support in a plurality of positions, and gears carried on said shafts and said stud interchangeable in a plurality of meshing relations as said rotatable member is moved about its pivot.

9. In a speed changing mechanism, a frame, a plurality of shafts journaled thereon, a support between said shafts having a plurality of openings therein, a disk journaled in one of said openings having a plurality of openings in its periphery, certain of which are movable into register with certain other openings in said bracket, a stud attached to said disk and disposed eccentrically with respect to the axis thereof, meshing gears carried on said shafts and said stud, and means extending through said registering openings for clamping said disk to said support.

10. In a speed changing mechanism, three parallel shafts, the intermediate one of which being shiftable with respect to the others, and three gears arranged on said shafts in the same plane and being interchangeable, the driving relation between the gears being maintained by changing the position of the shiftable shaft.

11. In a speed changing mechanism, three laterally arranged shafts, one of which is shiftable laterally, and three interchangeable gears in the same plane arranged on said shafts having their driving relation maintained by shifting the shiftable shaft upon interchanging the gears.

In testimony whereof we affix our signatures, in the presence of two witnesses.

GEORGE M. MERWIN.
EDWARD S. CHARLES.

Witnesses:
C. H. WILSON,
T. F. CROW.

Copies of this patent may be obtained for five cents each, by addressing the "Commissioner of Patents, Washington, D. C."